United States Patent
Cotter

(10) Patent No.: US 9,447,834 B2
(45) Date of Patent: Sep. 20, 2016

(54) OVERTRAVEL PRESSURE RELIEF FOR A GAS SPRING

(71) Applicant: DADCO, Inc., Plymouth, MI (US)

(72) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 0 days.

(21) Appl. No.: 14/607,351

(22) Filed: Jan. 28, 2015

(65) Prior Publication Data

US 2015/0137435 A1    May 21, 2015

Related U.S. Application Data

(63) Continuation-in-part of application No. 14/483,196, filed on Sep. 11, 2014.

(60) Provisional application No. 61/879,693, filed on Sep. 19, 2013.

(51) Int. Cl.
    *F16F 9/43* (2006.01)
    *F16F 9/02* (2006.01)

(52) U.S. Cl.
    CPC .......... *F16F 9/0281* (2013.01); *F16F 9/0218* (2013.01); *F16F 9/0236* (2013.01); *F16F 9/435* (2013.01); *F16F 2230/24* (2013.01)

(58) Field of Classification Search
    CPC ............. F16F 9/02; F16F 9/48; F16F 9/435; F16F 9/0209; F16F 9/437; B21D 24/02
    USPC ........................................................ 267/119
    See application file for complete search history.

(56) References Cited

U.S. PATENT DOCUMENTS

| | | | | |
|---|---|---|---|---|
| 1,548,773 A | * | 8/1925 | Ziebarth | .................. F16F 9/48 188/287 |
| 2,956,796 A | * | 10/1960 | Devillers | .............. F16F 9/0209 267/64.15 |

(Continued)

FOREIGN PATENT DOCUMENTS

| | | |
|---|---|---|
| DE | 42 16 573 A1 | 11/1993 |
| EP | 0 959 263 B1 | 7/2001 |

(Continued)

OTHER PUBLICATIONS

EP Search Report, Application No. 14185184.0-1755, Applicant: DADCO, Inc., Mailing Date: Mar. 11, 2015, 7 pages.

(Continued)

*Primary Examiner* — Robert A Siconolfi
*Assistant Examiner* — James Hsiao
(74) *Attorney, Agent, or Firm* — Reising Ethington, P.C.

(57) ABSTRACT

A gas spring for forming equipment. A casing includes an axially extending side wall, an open end, a transversely extending closed end wall axially spaced from the open end, and a pressure chamber established in part by the side and end walls to receive a gas under pressure. A piston rod is received at least partially in the casing for reciprocation between extended and retracted positions. A piston rod housing is received at least in part in the casing between the piston rod and the casing. An overtravel pressure relief feature includes a vent path that is disposed between the pressure chamber and the outside of the gas spring and that includes a vent passage through the side wall of the casing and a seal that sealingly interrupts the vent path, wherein displacement of the housing into the casing results in opening of the vent path.

24 Claims, 11 Drawing Sheets

(56) References Cited

U.S. PATENT DOCUMENTS

| | | | |
|---|---|---|---|
| 2,997,325 A | | 8/1961 | Peterson |
| 3,074,437 A | * | 1/1963 | Mercier ............... F15B 1/24 138/31 |
| 3,554,528 A | * | 1/1971 | Kring ................. F16F 9/44 188/285 |
| 3,847,426 A | * | 11/1974 | McGettigan ........... F16F 7/121 188/376 |
| 3,862,669 A | | 1/1975 | Lindbert et al. |
| 3,876,193 A | * | 4/1975 | Clary ................. B60G 17/052 267/64.16 |
| 3,995,842 A | * | 12/1976 | Freitag ................ F16F 9/0218 188/376 |
| 4,076,077 A | * | 2/1978 | Nix ................... E21B 34/10 166/321 |
| 4,099,445 A | * | 7/1978 | Singelmann ........... F41A 1/04 116/137 R |
| 4,121,449 A | * | 10/1978 | Celi .................. B21D 24/14 72/350 |
| 4,342,448 A | * | 8/1982 | Wallis ................ B21D 24/02 184/18 |
| 4,485,899 A | * | 12/1984 | Grundei ............... F16F 9/062 188/277 |
| 4,508,020 A | * | 4/1985 | Szcupak ............... F16F 9/363 188/322.17 |
| 4,765,227 A | * | 8/1988 | Balazs ................ B21D 24/02 137/493.2 |
| 4,813,655 A | * | 3/1989 | Hennells ............. F16F 9/43 137/102 |
| 5,069,317 A | | 12/1991 | Stoll et al. |
| 5,088,698 A | * | 2/1992 | Wallis ................ B21D 24/02 267/119 |
| 5,197,718 A | | 3/1993 | Wallis |
| 5,318,281 A | * | 6/1994 | Wallis ................ F16F 9/0209 267/119 |
| 5,485,987 A | * | 1/1996 | Jobelius ............. F16F 9/0218 188/322.17 |
| 5,735,371 A | * | 4/1998 | Jobelius ............. F16F 9/0218 188/276 |
| 5,860,665 A | * | 1/1999 | Giles ................ B62K 25/04 267/64.11 |
| 5,971,117 A | * | 10/1999 | Grundei .............. F16F 9/346 188/284 |
| 6,152,015 A | * | 11/2000 | Migliori ............. F15B 15/1419 92/177 |
| 6,152,245 A | * | 11/2000 | Nilsson .............. B25D 9/14 173/121 |
| 6,431,332 B1 | * | 8/2002 | Phelizot ............. F16F 9/0218 188/286 |
| 7,004,292 B2 | * | 2/2006 | Schilz ............... F16F 9/3242 188/276 |
| 8,196,723 B1 | * | 6/2012 | Shore ................ B60N 2/525 188/316 |
| 8,596,431 B2 | * | 12/2013 | Bruder ............... F15B 15/223 188/266.4 |
| 9,151,304 B2 | * | 10/2015 | Harper ............... F15B 15/16 |
| 2001/0002076 A1 | * | 5/2001 | Cotter ............... B21D 45/006 267/119 |
| 2002/0105119 A1 | * | 8/2002 | Holden ............... F16F 9/437 267/64.28 |
| 2002/0170794 A1 | * | 11/2002 | Dubach ............... A47B 88/047 188/381 |
| 2003/0213663 A1 | * | 11/2003 | Salice ............... E05F 5/08 188/284 |
| 2004/0113336 A1 | * | 6/2004 | Lundahl .............. F16F 9/437 267/119 |
| 2006/0231991 A1 | * | 10/2006 | Chun ................. F16F 9/0218 267/119 |
| 2008/0018028 A1 | * | 1/2008 | Kamioka ............. B60G 11/27 267/64.23 |
| 2008/0223244 A1 | * | 9/2008 | Ruegg ................ G10K 15/043 102/301 |
| 2008/0296814 A1 | * | 12/2008 | Franklin ............ B62K 25/04 267/64.25 |
| 2010/0132811 A1 | | 6/2010 | Cappeller et al. |
| 2011/0303084 A1 | * | 12/2011 | Cappeller ........... F15B 15/1428 92/169.1 |
| 2012/0042770 A1 | | 2/2012 | Cappeller et al. |
| 2012/0048665 A1 | * | 3/2012 | Marking ............. B60G 13/08 188/287 |
| 2012/0080279 A1 | * | 4/2012 | Galasso ............. B60G 17/08 188/297 |
| 2012/0097024 A1 | * | 4/2012 | Oudelaar ........... F15B 15/1476 92/134 |

FOREIGN PATENT DOCUMENTS

| | | |
|---|---|---|
| EP | 0 427 468 A1 | 11/2001 |
| EP | 1 241 373 B1 | 10/2007 |
| EP | 2 177 783 A2 | 4/2010 |
| ES | 1 041 675 U | 7/1999 |
| FR | 2 778 956 B1 | 11/1999 |
| FR | 2 779 194 A1 | 12/1999 |
| FR | 2 821 401 B1 | 8/2002 |
| FR | 2 833 326 A1 | 6/2003 |
| GB | 2 261 029 A | 5/1993 |
| JP | 49-70384 | 9/1947 |
| JP | 1 307531 A | 12/1989 |
| WO | WO 2010/102994 A1 | 9/2010 |
| WO | WO 2010/121946 A1 | 10/2010 |

OTHER PUBLICATIONS

Committee for the Normalization of Production Means (CNOMO), Press Tools Gas Springs and Accessories, E24.54.815.N, Jun. 1999, 22 pages.
Ressorts a Gaz Et Accessoires, Norm E24 Existing in Digitized Version 3D Catia V5, https://normesbis.psa-peugeot-citroen.com/normes/pn/pn00395/fr/pn00395.htm, May 7, 2012, 40 pp.
Renault, Gas Springs, Pneumatic Springs for Press Tooling, EM24.54.700, 35 pages.
Misumi Catalog 2007, 6 pages.

* cited by examiner

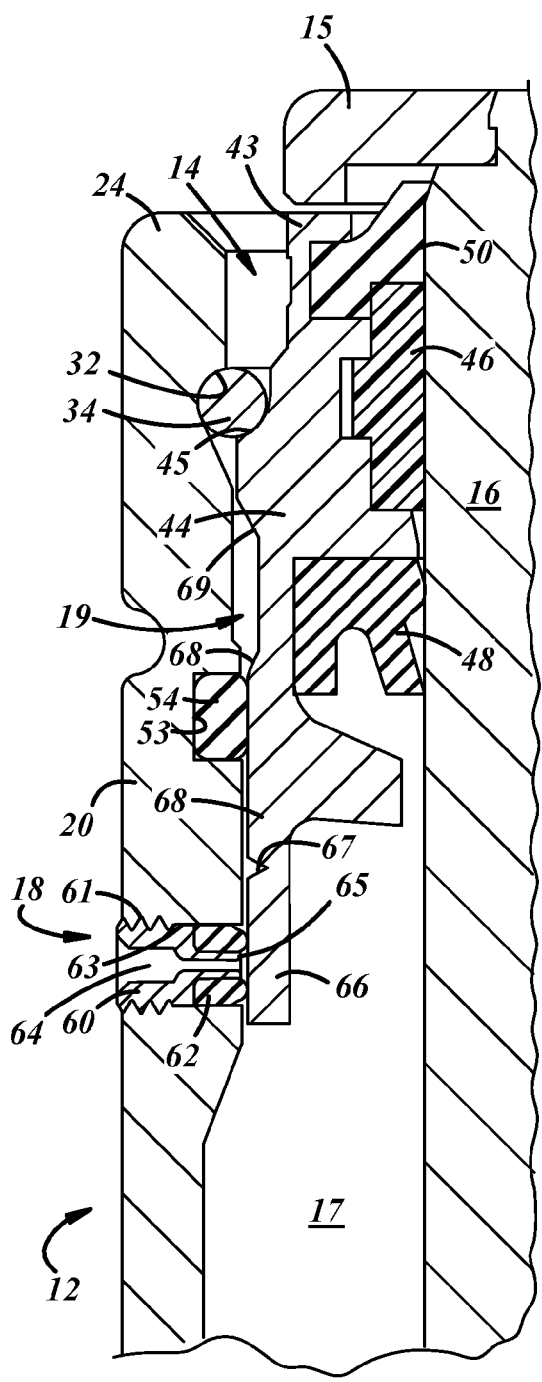
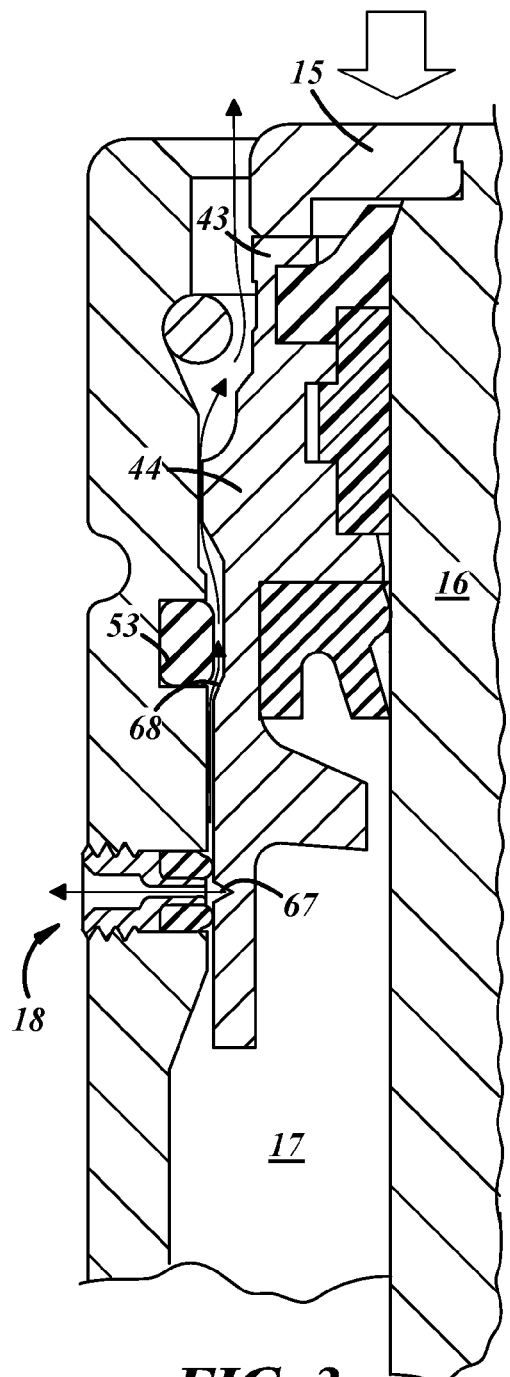
FIG. 2
FIG. 3

US 9,447,834 B2

OVERTRAVEL PRESSURE RELIEF FOR A GAS SPRING

TECHNICAL FIELD

This invention relates generally to gas springs and, more particularly, to overtravel pressure relief features for gas springs.

BACKGROUND

Gas springs are well known and have been used in dies of presses for sheet metal stamping operations. For example, gas springs can be used as press cushions, among many other types of applications. A conventional gas spring includes a casing, a piston rod carried in the casing, a bearing and sealing housing held in the casing by a retainer to guide and retain the piston rod within the casing, and a pressure chamber to hold pressurized gas, typically nitrogen at an operating pressure of, for example, 2,000 to 5,000 PSI in some applications. The housing includes one or more bearings to guide movement of the piston rod within the casing, and one or more seals to prevent leakage from the pressure chamber. The pressurized gas biases the piston rod to an extended position, and yieldably resists movement of the piston rod from the extended position to a retracted position. But the piston rod may overtravel beyond a design-intent retracted position, and overtravel may result in undesirable gas overpressure and other adverse conditions.

SUMMARY

In at least one implementation, a gas spring for forming equipment includes a casing including an axially extending side wall, an open end, a transversely extending closed end wall axially spaced from the open end, and a pressure chamber established in part by the side and end walls to receive a gas under pressure. The gas spring also includes a piston rod received at least in part in the casing for reciprocation between extended and retracted positions, and a piston rod housing received at least in part in the casing between the piston rod and the casing. The gas spring further includes an overtravel pressure relief feature including a vent path that is disposed between the pressure chamber and the outside of the gas spring and that includes a vent passage through the side wall of the casing and a seal that sealingly interrupts the vent path, wherein displacement of the housing into the casing results in opening of the vent path.

Some potential objects, features and advantages of the gas spring and/or its components set forth herein include providing a device that is readily usable with a wide range of forming equipment, readily permits use of common components among gas springs of different configuration and construction, can be easily serviced and its components replaced as needed, can be used in a wide range of applications having different size and force requirements, is readily adaptable to a wide range of press configurations, includes an overtravel pressure relief feature, and is of relatively simple design, economical manufacture and assembly, robust, durable, reliable and in service has a long useful life. Of course, an apparatus embodying the present invention may achieve, none, some, all or different objects, features or advantages than those set forth with regard to the illustrative embodiments disclosed herein.

BRIEF DESCRIPTION OF THE DRAWINGS

The following detailed description of preferred embodiments and best mode will be set forth with regard to the accompanying drawings in which:

FIG. 2 is an enlarged, fragmentary, sectional view of the gas spring of FIG. 1, illustrating a piston in a normal retracted position with respect to a casing;

FIG. 3 is an enlarged, fragmentary, sectional view of the gas spring of FIG. 1, and, in contrast to FIG. 2, illustrates the piston in an overtravel position with respect to the casing;

DETAILED DESCRIPTION OF PREFERRED EMBODIMENTS

Figure 1:
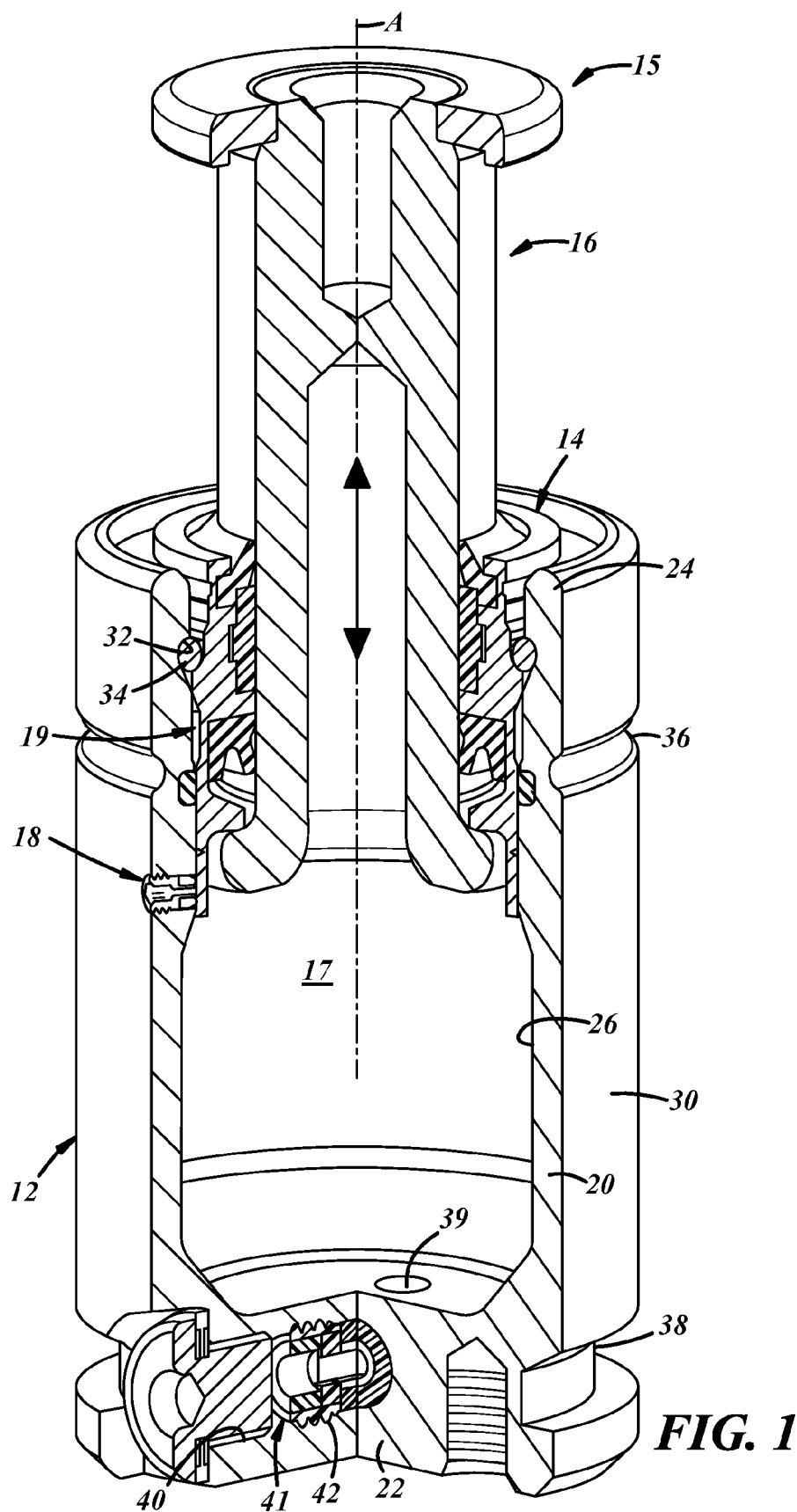
FIG. 1 is a fragmentary, sectional, perspective view of a presently preferred form of a gas spring with overtravel pressure relief features.
Figure 4:
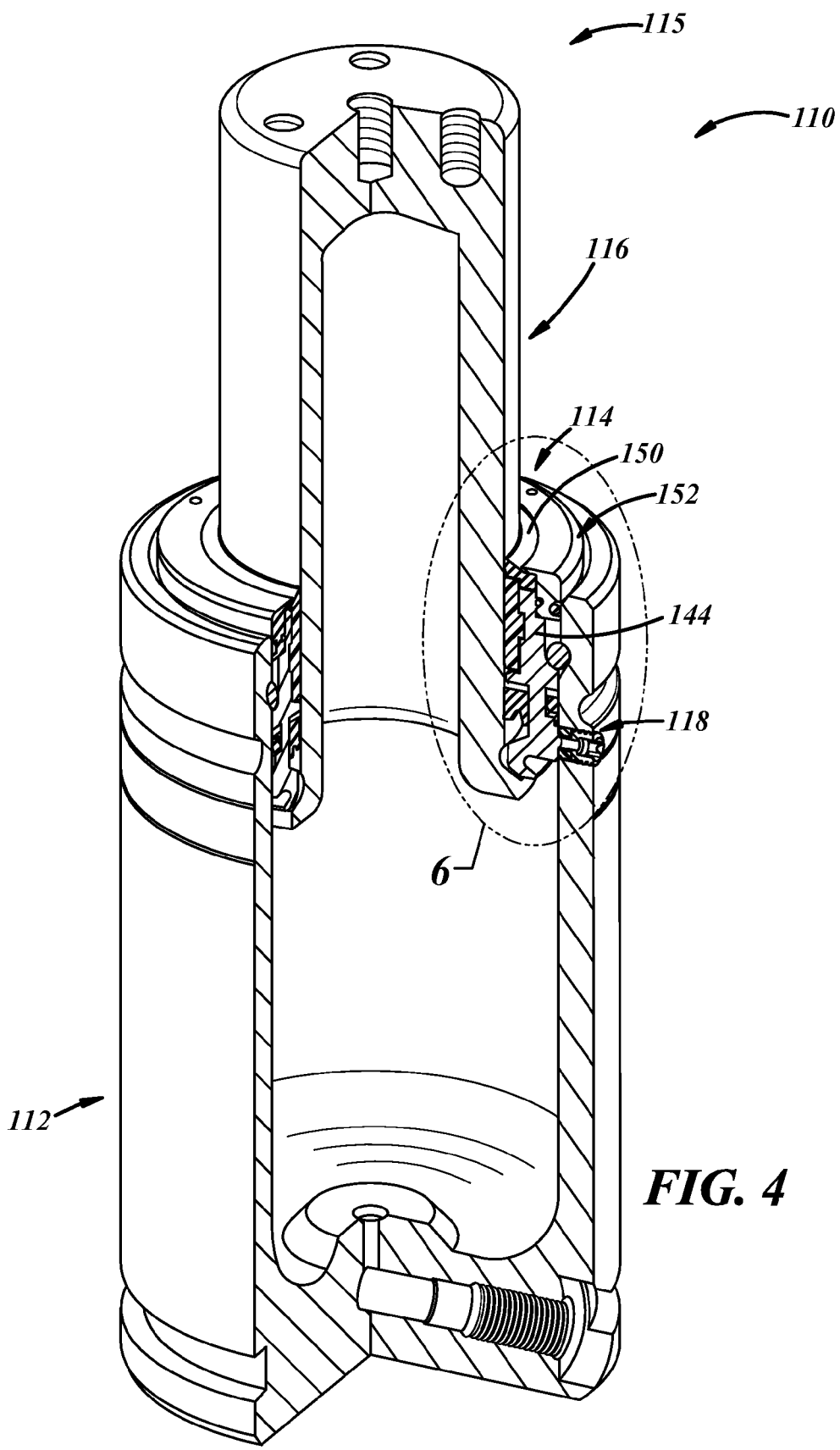
FIG. 4 is a fragmentary, sectional, perspective view of another presently preferred form of a gas spring with an overtravel pressure relief feature, and with a multi-piece piston rod housing.

Referring in more detail to the drawings, FIG. 1 illustrates a gas spring 10 that may be used in forming equipment, for example, sheet metal stamping dies and mechanical presses (not shown). In general, the gas spring 10 may include a casing 12, a guide and seal assembly 14 carried by the casing 12, a piston rod 16 carried by the casing 12 and extending through the guide and seal assembly 14 and having a piston plate 15 coupled thereto by fasteners, cooperating threads or other features, or in any suitable manner. The gas spring 10 also includes a pressure chamber 17 to hold a pressurized gas. An outer axial end of the piston rod 16 and/or the plate 15 may be engageable with a die member or another portion of a press or piece of forming equipment (not shown).

For example, one or more of the gas springs 10 may be used in various implementations in forming equipment to provide a moveable component for support of a forming die or a workpiece with a yielding force or a return force. For example, in a binder ring implementation, the gas spring 10 may provide a yielding force against a binder ring of a forming die to hold a metal workpiece while another part of the forming die forms, cuts, stretches, or bends the workpiece. In a lifter implementation, the gas spring 10 may provide a yielding force and return force to lift a workpiece off a surface of the forming die or to otherwise maintain control of the workpiece. In a cam tool implementation, the gas spring 10 may apply a yielding force to return a cam-activated tool to its home position. Of course, the gas spring 10 may be used in a wide range of other implementations.

According to the present disclosure, the gas spring 10 may include an overstroke or overtravel pressure relief feature 18 in the event of an overtravel condition of a piece of forming equipment with which the gas spring 10 may be used. As will be discussed in greater detail below, the overtravel pressure relief feature 18 may be carried by the casing 12. As an alternative, the gas spring 10 may include a different overtravel pressure relief feature 19 that may be carried by the assembly 14. Although both features are illustrated in the drawings, it is contemplated that only one or the other may be implemented for any given gas spring.

Each of the features 18, 19 may be in fluid communication with the pressure chamber 17 during an overtravel condition and may function to allow pressurized gas to be communicated out of the pressure chamber 17, to provide protection against overtravel conditions. The overtravel pressure relief features 18, 19 ordinarily do not allow gas in the pressure chamber 17 to exit the gas spring 10, absent an overtravel condition associated with the gas spring 10. But in the event of an overtravel condition, one or both of the overtravel pressure relief features 18, 19 may enable release of pressurized gas from within the pressure chamber 17 of the gas spring 10 to thereby significantly decrease the pressure of any gas remaining in the pressure chamber 17. As used herein, the terminology "overtravel condition" includes a condition where a die member, or any other machine component with which the gas spring 10 interacts, travels beyond a design intent position with respect to the gas spring 10.

With reference to FIG. 2, the casing 12 may include a side wall 20 that may terminate axially at a closed end 22 and at an open end 24 that receives the guide and seal assembly 14 and the piston rod 16 therein. The pressure chamber 17 is established at least in part by the side and end walls 20, 22 to receive a gas under pressure. The closed end 22 may be a separate component attached to the side wall 20, for example by a weld joint, or may be integrally produced with the side wall 20. The side wall 20 of the casing 12 has an inner surface 26 defining at least in part the pressure chamber 17, and an outer surface 30. The casing 12 may be of generally cylindrical shape, for example, wherein at least one of the inner or outer surfaces 26, 30 is cylindrical. The inner surface 26 of the side wall 20 may have a circumferential retainer groove 32 constructed for receipt of a retainer, shown here by way of example as a split ring 34, to maintain the gas spring 10 in its assembled state. To facilitate mounting and locating the gas spring 10 within a press, a pair of longitudinally spaced circumferential grooves 36, 38 may be machined, formed, or otherwise provided in the outer surface 30 of the casing 12 adjacent its ends 22, 24. To admit gas into the gas spring 10, the casing 12 may include a passage or fill port 40 that may be provided through the closed end 22 of the casing 12 in any suitable manner. The fill port 40 may include a threaded passage 42 for coupling of a fill valve 41, e.g., a Schrader valve, to the casing 12. The closed end 22 of the casing 12 also may include a passage 39 in fluid communication between and with the pressure chamber 17 and the fill port 40.

With reference to FIG. 2, the guide and seal assembly 14 may be disposed in the open end 24 of the casing 12 and may be sealingly coupled to the casing 12. The assembly 14 may include a piston rod housing 44, a guide bushing 46, a rod seal 48, a rod wiper 50, a dust cover (not shown), all of which may be carried by the housing 44, and a casing seal 54 that may be carried by the casing 12 in a seal groove 53. The guide bushing 46 may be composed of any suitable low friction material, and may be sized to slidably engage the piston rod 16 to guide the piston rod 16 for axial reciprocation within the casing 12. The housing 44 may include a shoulder 45 in an outer surface thereof to cooperate with the split ring 34, which may removably retain the housing 44 in the casing 12.

The piston rod 16 is disposed at least in part in the casing 12 and through the guide and seal assembly 14 for reciprocation along an axis A between extended and retracted positions over a cycle of the gas spring 10 including a retraction stroke and an extension or return stroke. The piston rod 16 is acted on by gas in the pressure chamber 17 to bias the piston rod 16 toward the extended position, and away from the retracted position. The piston rod 16 extends out of the casing 12 through the guide and seal assembly housing 44, and includes an outer axial end, and an inner axial end disposed in the casing 12 and that may be radially enlarged and engageable with a portion of the piston rod housing 44 to retain the piston rod 16 in the casing 12. The piston rod 16 is in sealing engagement with the rod seal 48 and in sliding engagement with the piston rod bushing 46 for guided relative movement between the extended and retracted positions.

The overtravel pressure relief feature 18 may be a vent plug including a plug body 60 and a plug seal 62 carried by the body 60. The feature 18 may be carried in a vent passage 63 of the sidewall 20 of the casing 12. The plug body 60 may include a threaded outer diameter 61 for threading into the corresponding vent passage 63, which may be threaded. Accordingly, the plug body 60 also may have a through passage 64 with a counterbore, which may have tool features to cooperate with a tool (not shown), for example, internal flats, for instance, hex flats for cooperation with an Allen wrench or the like for installing and/or removing the plug body 60. The plug body 60 further may include a stepped down end 65 to carry the plug seal 62. The plug seal 62 may be an annular seal for sealing engagement with a lower portion or skirt 66 of the piston rod housing 44. The plug seal 62 may engage a smooth cylindrical portion of the housing 44, or any other suitable geometric portion of the housing 44 that provides a good seal. Additionally, the axial face of the stepped down end 65 of the plug body 60 may be in full circumferential contact with the housing 44. In any case, the vent plug establishes a fully circumferential, annular seal with the housing 44 that is ordinarily completely closed, absent an overtravel condition. The seal 62 may be composed of a urethane, nitrile, or any other suitable sealing material, and may be of 70-90 durometer on the Shore A scale.

The alternative overtravel pressure relief feature 19 may be a groove, notch, flattening, reduced diameter, or any other relief in an outer diameter of the piston rod housing 44. The feature 19 may include a lower end 68 that may be axially adjacent and/or overlapping a portion of the seal 54, and an upper end 69 axially spaced from the lower end 68. One or both of the ends 68, 69 may be conical or otherwise tapered surfaces.

With reference now to FIG. 3, when the piston 16 has travelled past a design-intent fully retracted position, such that the piston 16 has overtravelled, one or both of the relief features 18, 19 enable desired depressurization of the pressure chamber 17. When the piston 16 overtravels, the piston plate 15 strikes an upper end 43 of the housing 44 to displace the housing 44 into the casing 12.

The overtravel pressure relief feature 18 enables depressurization when the piston rod housing 44 is displaced into the casing 12 to an extent that some recessed feature of the housing 44 axially overlaps the seal 62 so as weaken, interrupt, or otherwise breach the seal between the seal 62 and the housing 44 to allow gas to escape therebetween and out of the side of the gas spring 10 as indicated by horizontal arrows. In the illustrated embodiment, the recessed feature includes at least the lower portion 68 of the alternative feature 19. In other embodiments, the recessed feature may include some lower portion or extension of the seal groove 53, or any other suitable shallow groove, relief, or recess.

The alternative feature 19 enables depressurization when the piston rod housing 44 is displaced into the casing 12 to an extent that the lower portion of the feature 19 is displaced past a lower portion of the seal 54 so as to weaken or interrupt sealing between the seal 62 and the housing 44 to allow gas to escape therebetween and out of the open end of the gas spring 10 as indicated by vertical arrows in FIG. 3.

The gas spring 10 may be assembled in any suitable manner and its various components may be manufactured in any suitable manner and composed of any suitable materials. For example, the casing 12 may be turned, bored, drilled, tapped, and/or otherwise machined from tube and/or solid bar stock. In another example, the vent plug body 60 may be constructed from, for example, steel, brass, copper, carbon fiber, and/or any other suitable material(s).

In assembly, the guide and seal assembly 14 may be pre-assembled, and the piston rod 16 may be assembled through the housing 44, and the assembly 14 with the rod 16 therein may be assembled into the casing 12 and retained therein in any suitable manner, for example via assembly of the split ring 34 into the groove 32. Thereafter, the vent plug may be threaded or otherwise coupled to the casing 12 until the seal 62 seals with the housing 44.

In operation, and with respect to FIG. 1, any suitable pressurizing device (not shown) may be coupled to the port 40 to open the valve 41 and introduce pressurized gas through the port 40 into the chamber 17. Once a desired pressure is reached, the pressurizing device may be retracted to allow the valve 41 to seat and thereby seal the pressurized gas within the pressure chamber 17.

Thereafter, the gas spring 10 may be used for any suitable purpose and, in the event of an overtravel condition where a machine component travels beyond a design intent position with respect to the gas spring 10, the piston plate 15 strikes the exterior end of the housing 44, thereby displacing the housing 44 axially into the casing 12, and thereby resulting in breach or unseating of one or more of the seals 54, 62. Such unseating will allow pressurized gas in the chamber 17 to escape through one or both of the features 18, 19.

FIGS. 4-7 illustrate another presently preferred form of a gas spring 110. This form is similar in many respects to the form of FIGS. 1-3 and like numerals between the forms generally designate like or corresponding elements throughout the several views of the drawing figures. Accordingly, the description of the embodiments are incorporated by reference into one another in their entireties, and a description of the common subject matter generally may not be repeated here.

The gas spring 110 includes a guide and seal assembly 114 including an annular housing cap 152 coupled to an upper end 143 of a piston rod housing 144 and trapping a wiper 150 therebetween. The cap 152 extends the length of the housing 144 so that the housing 144 projects beyond the open end of the casing 112 and may allow for partial travel of the housing 144 axially into the casing 112 in that the cap 152 may be stopped by the retaining ring 134. The cap 152 may be coupled to the housing 144 by fasteners, threading or other integral fastening, welding, or in any suitable manner.

Figure 5:
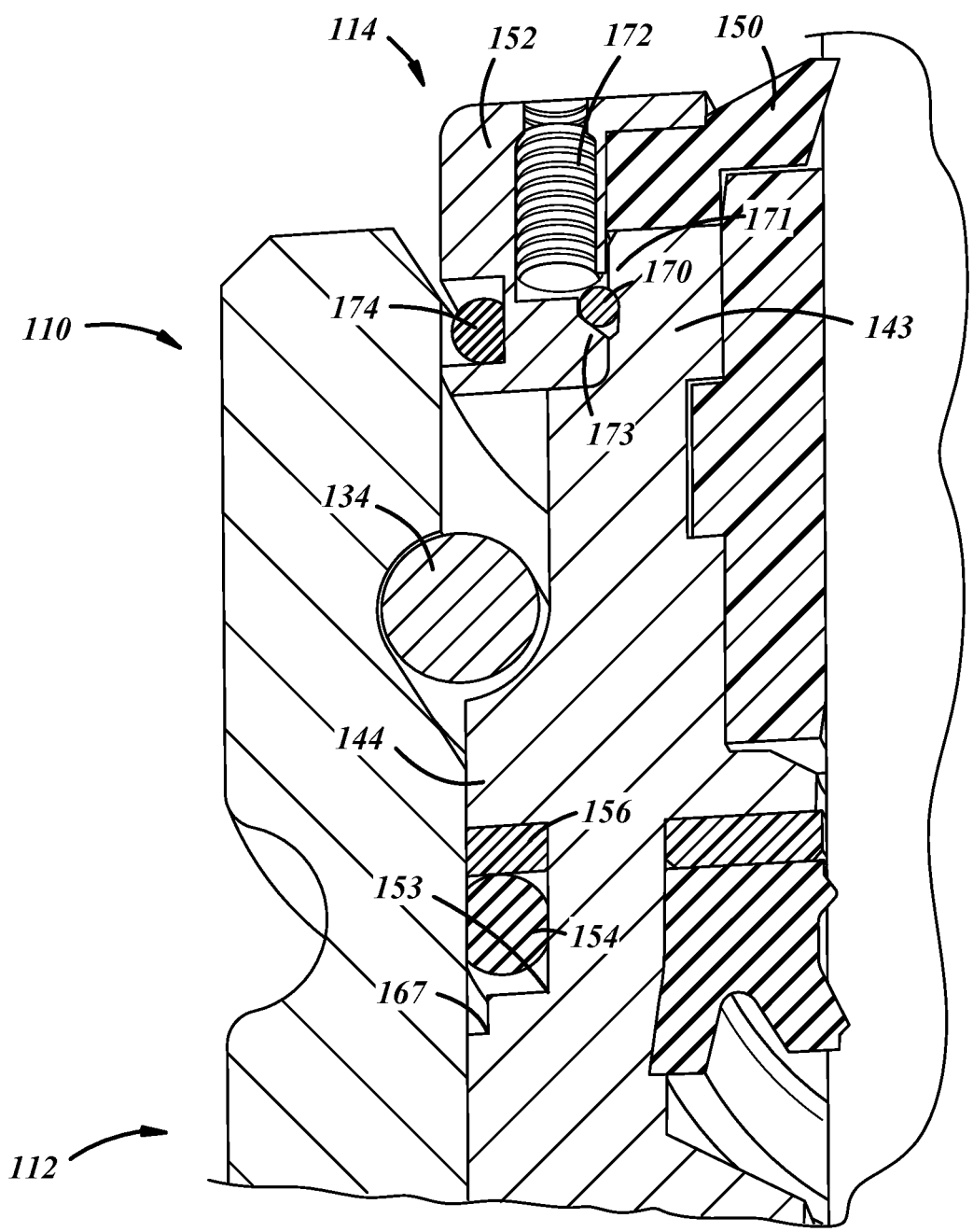
FIG. 5 is an enlarged, fragmentary, sectional view of the gas spring of FIG. 4, illustrating a coupling arrangement between upper and lower portions of the piston rod housing.
Figure 6:
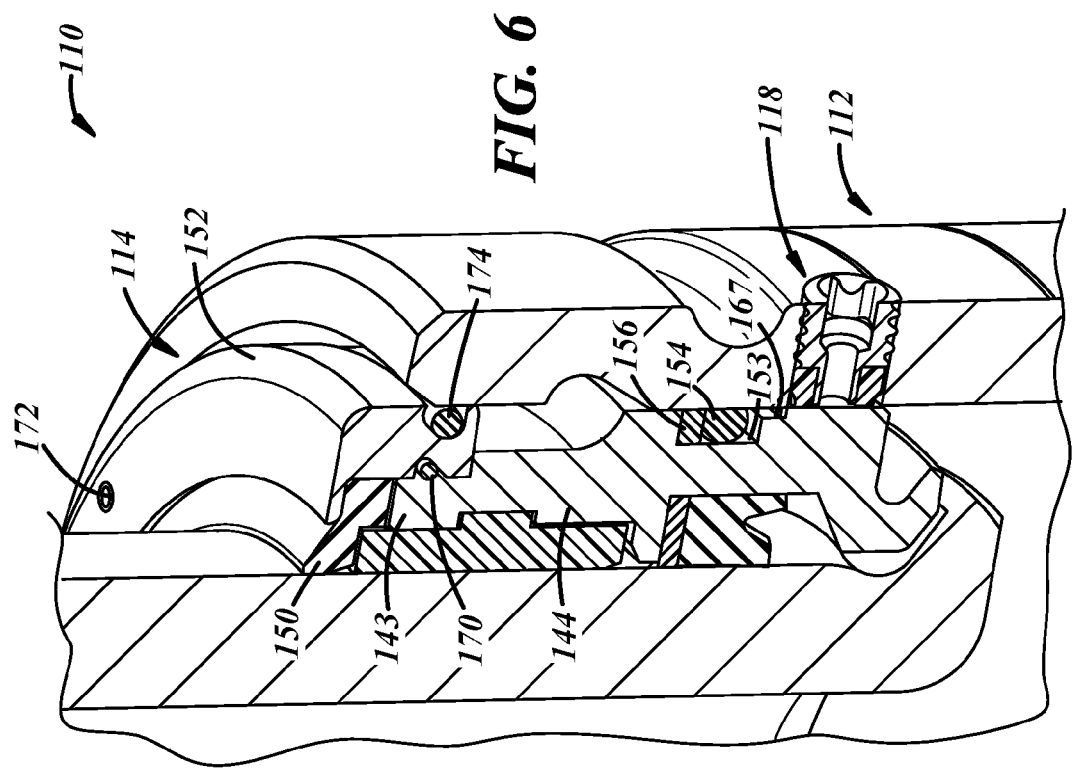
FIG. 6 is an enlarged, fragmentary, sectional view of the gas spring of FIG. 4, illustrating the piston rod housing.

For example, and with respect to FIGS. 5 and 6, a retention ring 170 may be carried between corresponding radially outwardly and inwardly extending shoulders 171, 173 of the housing 144 and the cap 152, respectively. Also, set screws 172 may be threaded into the cap 152 and into engagement with the retention ring 170 to seat the retention ring 170 to the corresponding housing shoulder 171. The retention ring 170 may be a C-shaped ring. Additionally, the cap 152 may carry an annular seal 174 for sealing the assembly 114 to the casing 112.

With reference to FIG. 6, the assembly 114 also may include a piston rod housing seal 154 and a seal backup 156 that may be carried by the housing 144 in a seal groove 153. Also, the housing 144 may include a step, turned down annulus, notch, circumferential groove, spiral groove, flattening, or any other suitable recessed feature 167, which may be axially adjacent to and in recessed communication with the seal groove 153.

Figure 7:
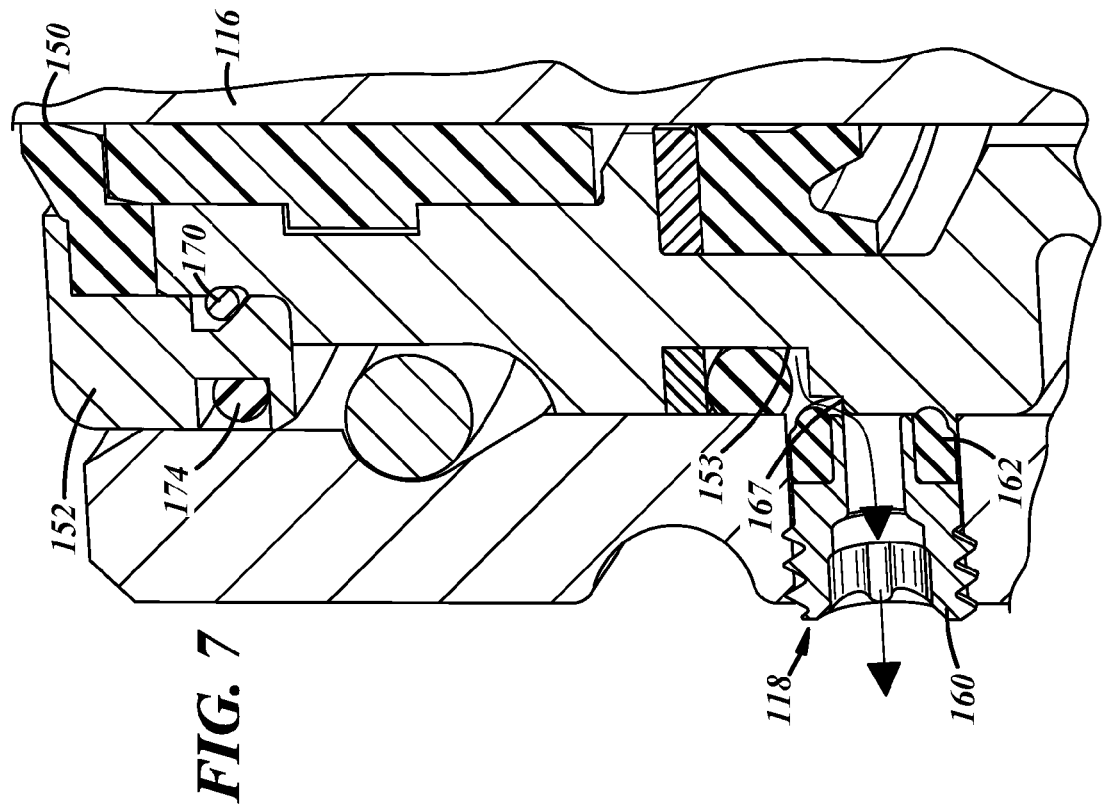
FIG. 7 is a further enlarged, fragmentary, sectional view of the gas spring of FIG. 4, illustrating an overtravel condition thereof.

Accordingly, as illustrated in FIG. 7, when the piston 116 has travelled past a design-intent fully retracted position, such that the piston 116 has overtravelled, the relief feature 118 enables desired depressurization of the gas spring 110. When a die plate or other machine component and the piston 116 overtravel, the machine component strikes the cap 152 to displace the housing 144 axially into the casing 112.

The relief feature 118 enables depressurization when the piston rod housing 144 is axially displaced into the casing 112 to an extent that the recessed feature 167 of the housing 144 axially overlaps the plug seal 162 so as to weaken, interrupt, or otherwise breach the seal between the seal 162 and the housing 144 to allow gas to escape therebetween and out of the side of the gas spring 110 via the passage through the plug 160 as indicated by the horizontal arrows in FIG. 7.

Figure 8:
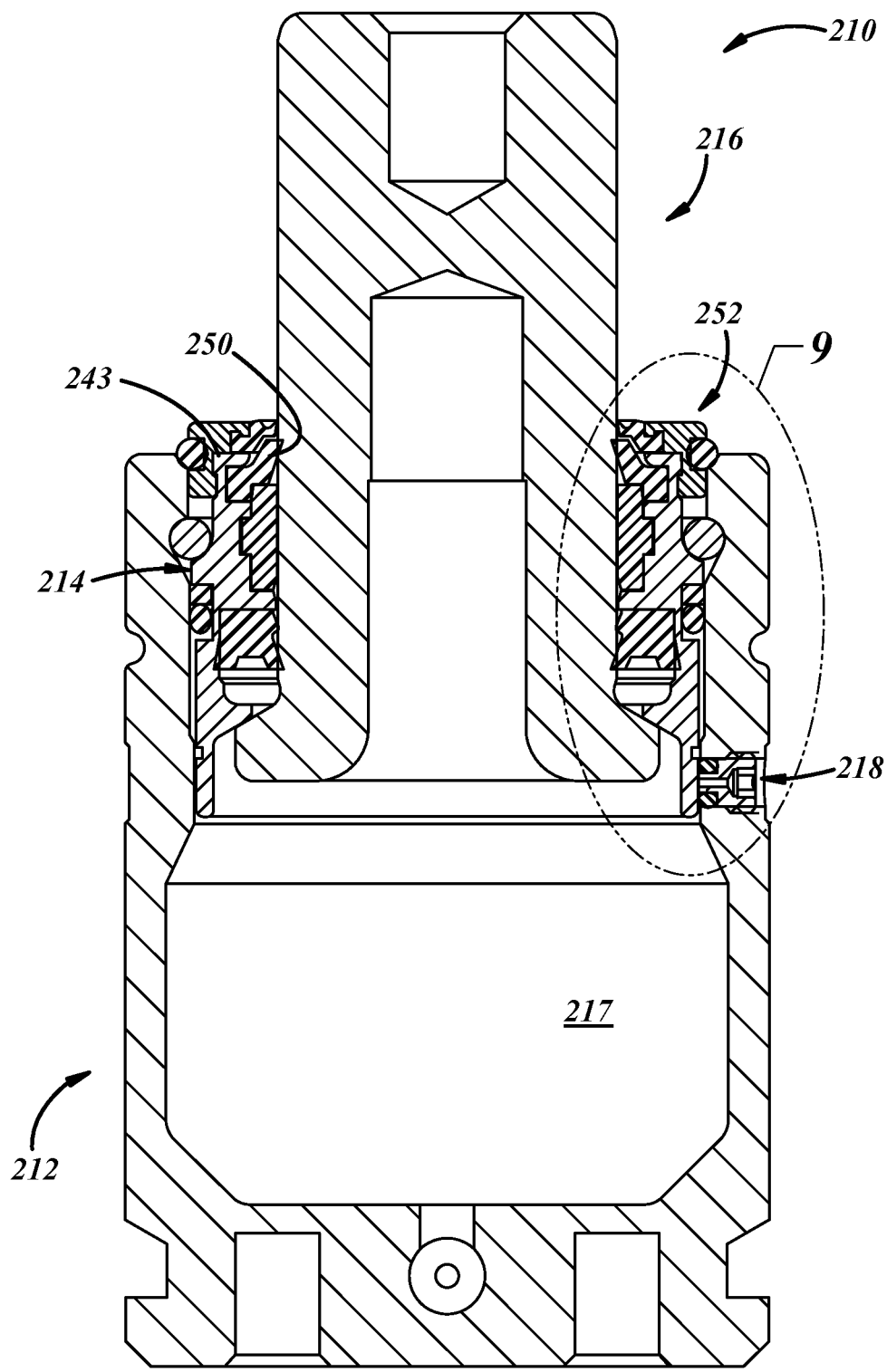
FIG. 8 is a cross-sectional, elevational view of an additional presently preferred form of a gas spring with an overtravel pressure relief feature, and with a multi-piece piston rod housing.
Figure 9:
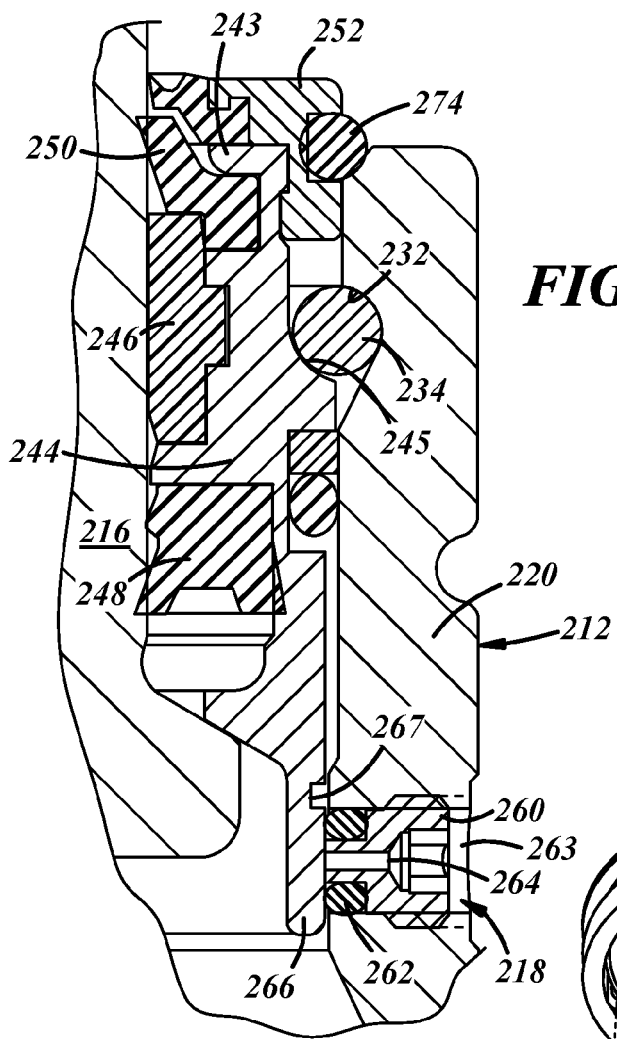
FIG. 9 is an enlarged, fragmentary, sectional view of the gas spring of FIG. 8, taken from oval 9 of FIG. 8, illustrating the piston rod housing.
Figure 10:
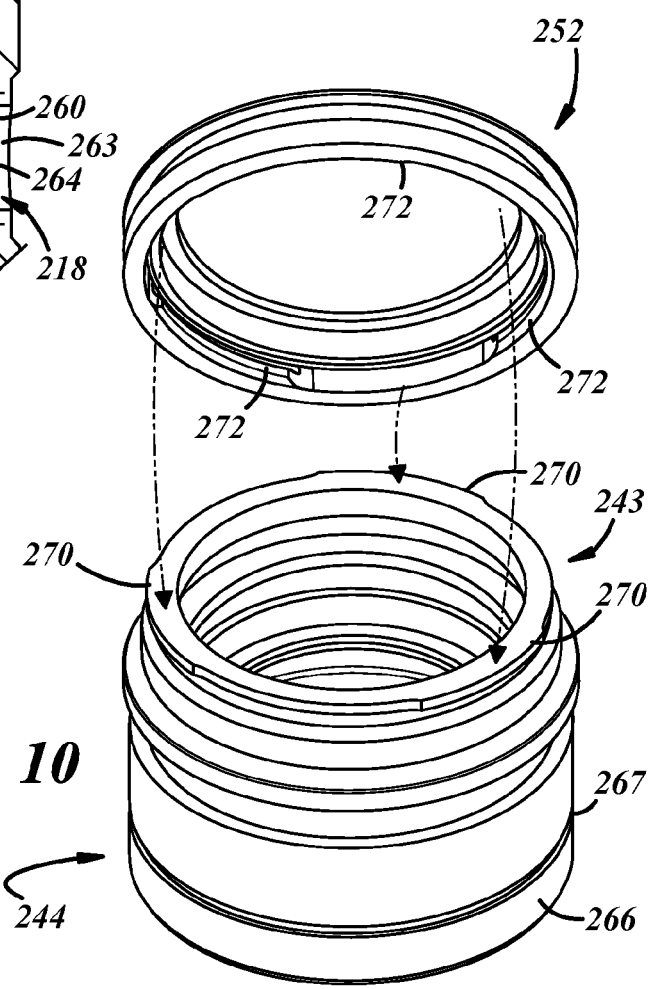
FIG. 10 is an enlarged, exploded view of the multi-piece piston rod housing of FIG. 8.

FIGS. 8-10 illustrate another presently preferred form of a gas spring 210. This form is similar in many respects to the form of FIGS. 1-7 and like numerals between the forms generally designate like or corresponding elements throughout the several views of the drawing figures. Accordingly, the description of the embodiments are incorporated by reference into one another in their entireties, and a description of the common subject matter generally may not be repeated here.

The gas spring 210 includes a casing 212, a guide and seal assembly 214 carried by the casing 12, a piston rod 216 carried by the casing 212 and extending through the guide and seal assembly 214, and a pressure chamber 217 to hold a pressurized gas. Also, the gas spring 210 includes an overtravel pressure relief feature 218. The guide and seal assembly 214 includes a housing cap 252 that is coupled to an upper end 243 of a piston rod housing 244 and traps a wiper 250 therebetween.

With respect to FIGS. 9 and 10, the cap 252 may be coupled to the housing 244 by an integral coupling configuration, for example, a bayonet connection. More specifically, the cap 252 may be of generally cylindrical configuration and may include a plurality of radially inwardly extending bayonet lugs 272. Likewise, the upper end 243 of the piston rod housing 244 may be of generally cylindrical configuration and may include a plurality of radially outwardly extending bayonet lugs 270 for cooperation with the cap lugs 272. In assembly, the cap 252 is lowered over the housing upper end 243 so that the cap lugs 272 register in spaces between the housing lugs 270. Then, the cap 252 is rotated so that the cap lugs 272 underlie and engage the housing lugs 270 to lock the cap 252 onto the housing 244.

The overtravel pressure relief feature 218 may be a vent plug including a plug body 260 and a plug seal 262 carried by the body 260. The feature 218 is in a vent passage 263 of a sidewall 220 of the casing 212. The plug body 260 may be coupled into the corresponding vent passage 263 by threading or in any other suitable manner. The plug body 260 has a through passage 264 and a sealing end 265 carrying a plug seal 262 that engages the housing 244. As indicated in FIG. 9, the axial end face of the end 265 of the plug body 260 is in full circumferential contact with the housing 244. Also, the housing 244 includes a recessed feature 267, which may be a fully circumferential groove as shown, or a step, turned down annulus, notch, spiral groove, flattening, or any other suitable recessed feature axially adjacent to and normally downstream of the plug body 260 and seal 262.

In the event of an overtravel condition where a machine component travels beyond a design intent position with respect to the gas spring 110, the machine component strikes the cap 252, thereby axially displacing the housing 244 further into the casing 212, and thereby moving the recessed feature 267 into fluid communication with the through passage 264 of the plug 260 to allow pressurized gas in the chamber 217 to escape through the overtravel feature 218.

FIGS. 11-14 illustrate another presently preferred form of a gas spring 310. This form is similar in many respects to the form of FIGS. 1-10 and like numerals between the forms generally designate like or corresponding elements throughout the several views of the drawing figures. Accordingly, the description of the embodiments are incorporated by reference into one another in their entireties, and a description of the common subject matter generally may not be repeated here.

Figure 11:
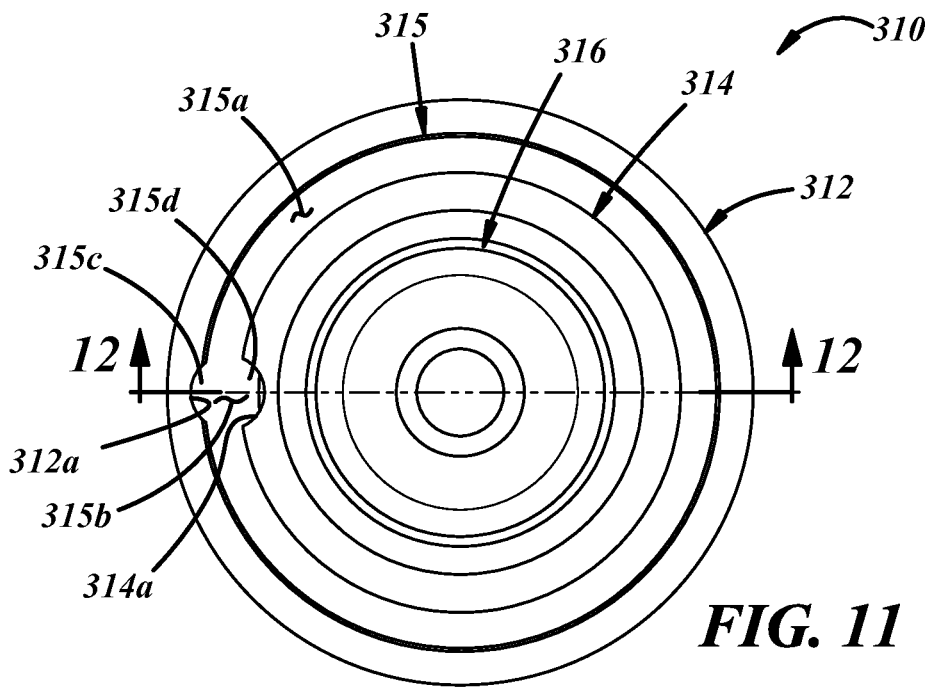
FIG. 11 is a top view of another presently preferred form of a gas spring with overtravel pressure relief features.

FIG. 11 illustrates a gas spring 310 that may be used in forming equipment, for example, sheet metal stamping dies and mechanical presses (not shown). In general, the gas spring 310 may include a casing 312, a guide and seal assembly 314 carried by the casing 312, and a piston rod 316 carried by the casing 312 and extending through the guide and seal assembly 314. Although not shown, a piston plate may be coupled to the rod 316 by fasteners, cooperating threads or other features, or in any other suitable manner. The gas spring 310 also may include a locator 315 carried at the top of the gas spring 310 between the casing 312 and the guide and seal assembly 314.

The locator 315 may be a dust cover for the gas spring 310 and, in any case, may include an annular shaped body 315a, and a locating feature 315b that circumferentially intersects the annular shaped body 315a. The locating feature 315b may include a radially outwardly projecting protuberance 315c received within a corresponding pocket 312a of the casing 312, and a radially inwardly projecting protuberance 315d received within a corresponding pocket 314a of the guide and seal assembly 314. The locating feature 315b circumferentially locates the guide and seal assembly 314 with respect to the casing 312, for purposed described further herein below.

Figure 12:
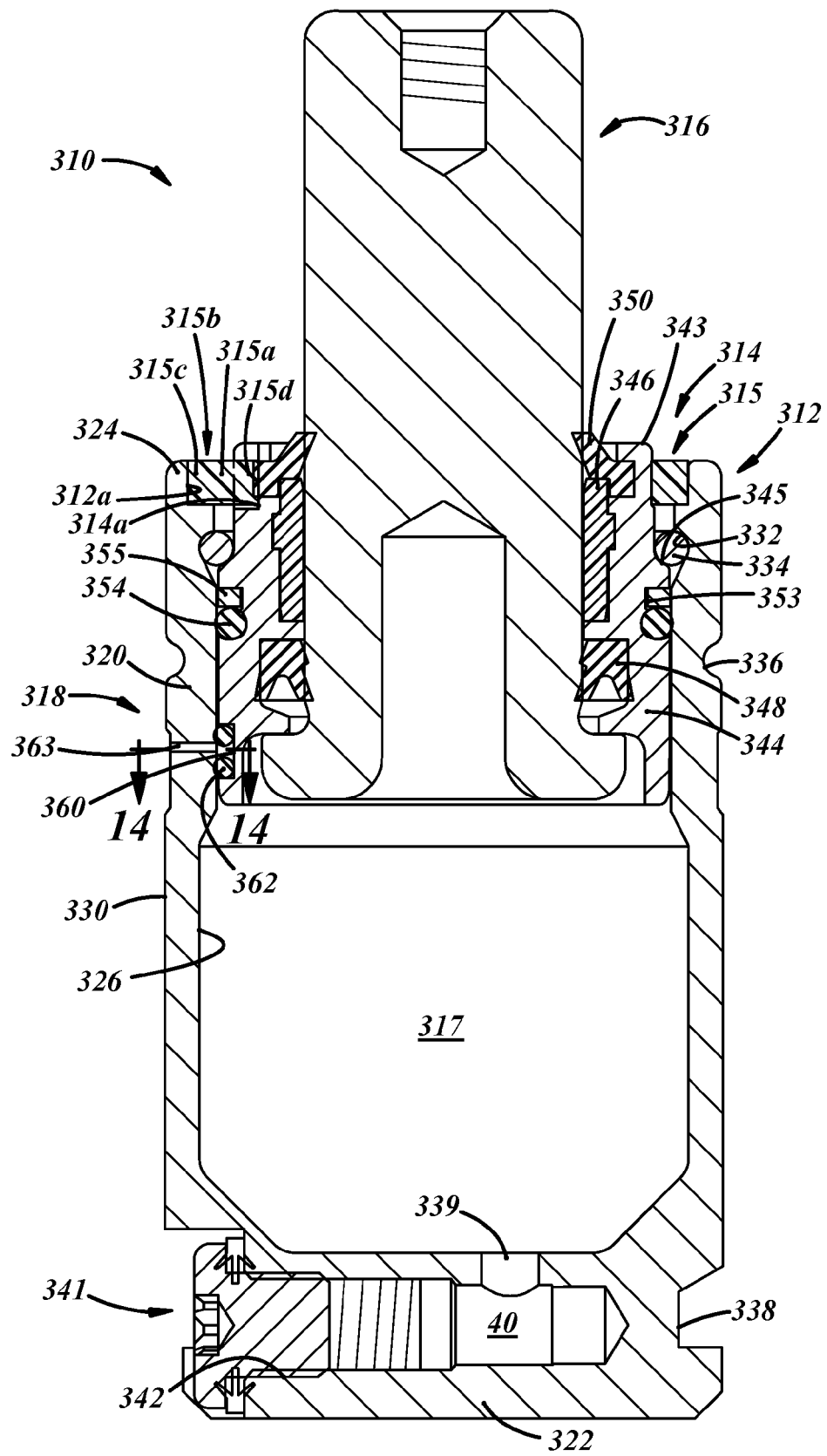
FIG. 12 is a sectional view of the gas spring of FIG. 11, taken along line 12-12 of FIG. 11, and illustrating a piston in an advanced position with respect to a casing.

With reference to FIG. 12, the gas spring 310 also includes a pressure chamber 317 to hold a pressurized gas. Also, an outer axial end of the piston rod 316 (and/or a piston plate coupled thereto), may be engageable with a die member or another portion of a press or piece of forming equipment (not shown).

With reference to FIG. 12, the casing 312 may include a side wall 320 that may terminate axially at a closed end 322 and at an open end 324 that receives the guide and seal assembly 314 and the piston rod 316 therein. The pressure chamber 317 is established at least in part by the side and end walls 320, 322 to receive a gas under pressure. The closed end 322 may be a separate component attached to the side wall 320, for example by a weld joint, or may be integrally produced with the side wall 320. The side wall 320 of the casing 312 has an inner surface 326 defining at least in part the pressure chamber 317, and an outer surface 330. The casing 312 may be of generally cylindrical shape, for example, wherein at least one of the inner or outer surfaces 326, 330 is cylindrical. The inner surface 326 of the side wall 320 may have a circumferential retainer groove 332 constructed for receipt of a retainer, shown here by way of example as a split ring 334, to maintain the gas spring 310 in its assembled state. To facilitate mounting and locating the gas spring 310 within a press, a pair of longitudinally spaced circumferential grooves 336, 338 may be machined, formed, or otherwise provided in the outer surface 330 of the casing 312 adjacent its ends 322, 324. To admit gas into the gas spring 310, the casing 312 may include a passage or fill port 340 that may be provided through the closed end 322 of the casing 312 in any suitable manner. The fill port 340 may include a threaded passage 342 for coupling of a fitting 341, which may include a plug, or a fill valve, e.g., a Schrader valve, to the casing 312. The closed end 322 of the casing 312 also may include a passage 339 in fluid communication between and with the pressure chamber 317 and the fill port 340.

With reference to FIG. 12, the guide and seal assembly 314 may be disposed in the open end 324 of the casing 312 and may be sealingly coupled to the casing 312. The assembly 314 may include a piston rod housing 344, a guide bushing 346, a rod seal 348, a rod wiper 350, the locator 315, and a seal 354 and a backup ring 355 that may be carried by the housing 344 in a seal groove 353, all of which may be carried by the housing 344 for assembly into the casing 312. The guide bushing 346 may be composed of any suitable low friction material, and may be sized to slidably engage the piston rod 316 to guide the piston rod 316 for axial reciprocation within the casing 312. The housing 344 may include a shoulder 345 in an outer surface thereof to cooperate with the split ring 334, which may removably retain the housing 344 in the casing 312.

The piston rod 316 is disposed at least in part in the casing 312 and through the guide and seal assembly 314 for reciprocation along an axis A between extended and retracted positions over a cycle of the gas spring 310 including a retraction stroke and an extension or return stroke. The piston rod 316 is acted on by gas in the pressure chamber 317 to bias the piston rod 316 toward the extended position, and away from the retracted position. The piston rod 316 extends out of the casing 312 through the guide and seal assembly housing 344, and includes an outer axial end, and an inner axial end disposed in the casing 312 and that may be radially enlarged and engageable with a portion of the piston rod housing 344 to retain the piston rod 316 in the casing 312. The piston rod 316 is in sealing engagement with the rod seal 348 and in sliding engagement with the piston rod bushing 346 for guided relative movement between the extended and retracted positions.

With reference to FIG. 12, the gas spring 310 may include an overstroke or overtravel pressure relief feature 318 in the event of an overtravel condition of a piece of forming equipment with which the gas spring 310 may be used. The feature 318 may be in fluid communication with the pressure chamber 317 during an overtravel condition and may function to allow pressurized gas to be communicated out of the pressure chamber 317, to provide protection against overtravel conditions. The overtravel pressure relief feature 318 ordinarily does not allow gas in the pressure chamber 317 to exit the gas spring 310, absent an overtravel condition associated with the gas spring 310. But in the event of an overtravel condition, the overtravel pressure relief feature 318 may enable release of pressurized gas from within the pressure chamber 317 of the gas spring 310 to thereby significantly decrease the pressure of any gas remaining in the pressure chamber 317. As used herein, the terminology "overtravel condition" includes a condition where a die member, or any other machine component with which the gas spring 310 interacts, travels beyond a design intent position with respect to the gas spring 310.

Figure 14:
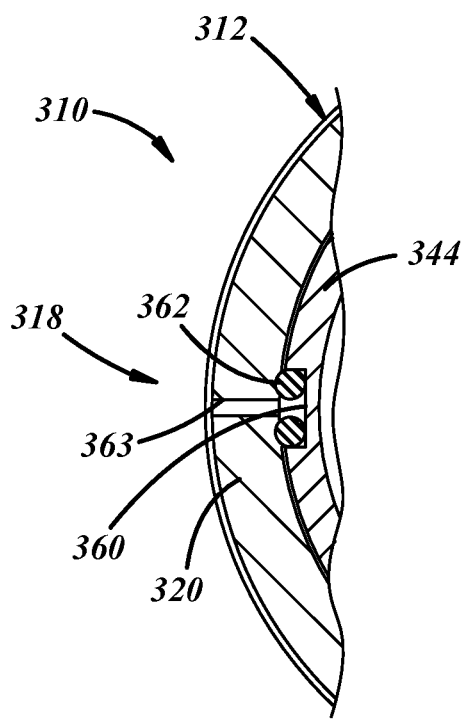
FIG. 14 is a fragmentary sectional view of a portion of the gas spring of FIG. 11, taken along line 14-14 of FIG. 12.

With reference to FIGS. 12 and 14, the overtravel pressure relief feature 318 includes a normally sealed vent path disposed between the pressure chamber 317 and the outside of the gas spring 310. The vent path includes a normally sealed vent passage 363 through the side wall 320 of the casing 312. The feature 318 also includes a vent seal 362 that sealingly interrupts the vent path, wherein displacement of the housing 344 into the casing 312 results in opening of the vent path. The seal 362 may cooperate with the casing 312 in a location at an interior end of the vent passage 363. The feature 318 also may include a seal pocket 360 to carry the vent seal 362, wherein the seal pocket 360 may be circular and the vent seal 362 may be annular to seal around an interior end of the vent passage 363. For instance, the seal 362 may include an annular seal, for example, an O-ring for sealing engagement with an inside surface of the casing 312 circumferentially around the vent passage 363. In other embodiments, the seal pocket 360 may be of a different shape and the vent seal 362 may be a discrete, solid plug of material with or without a hole therethrough. Accordingly, the vent seal 362 at least fully circumferentially surrounds the vent passage 363 if not completely covers it, such that the vent seal 362 provides at least a fully circumferential seal with the casing 312 that is ordinarily completely closed, absent an overtravel condition of the gas spring 310 which results in displacement of at least a portion of the seal 362 past the vent passage 363 to breach the seal 362. In other words, the seal 362 is in sealing registration with respect to the vent passage 363. The seal 362 may be composed of a urethane, nitrile, or any other suitable sealing material, and may be of 70-90 durometer on the Shore A scale.

Figure 13:
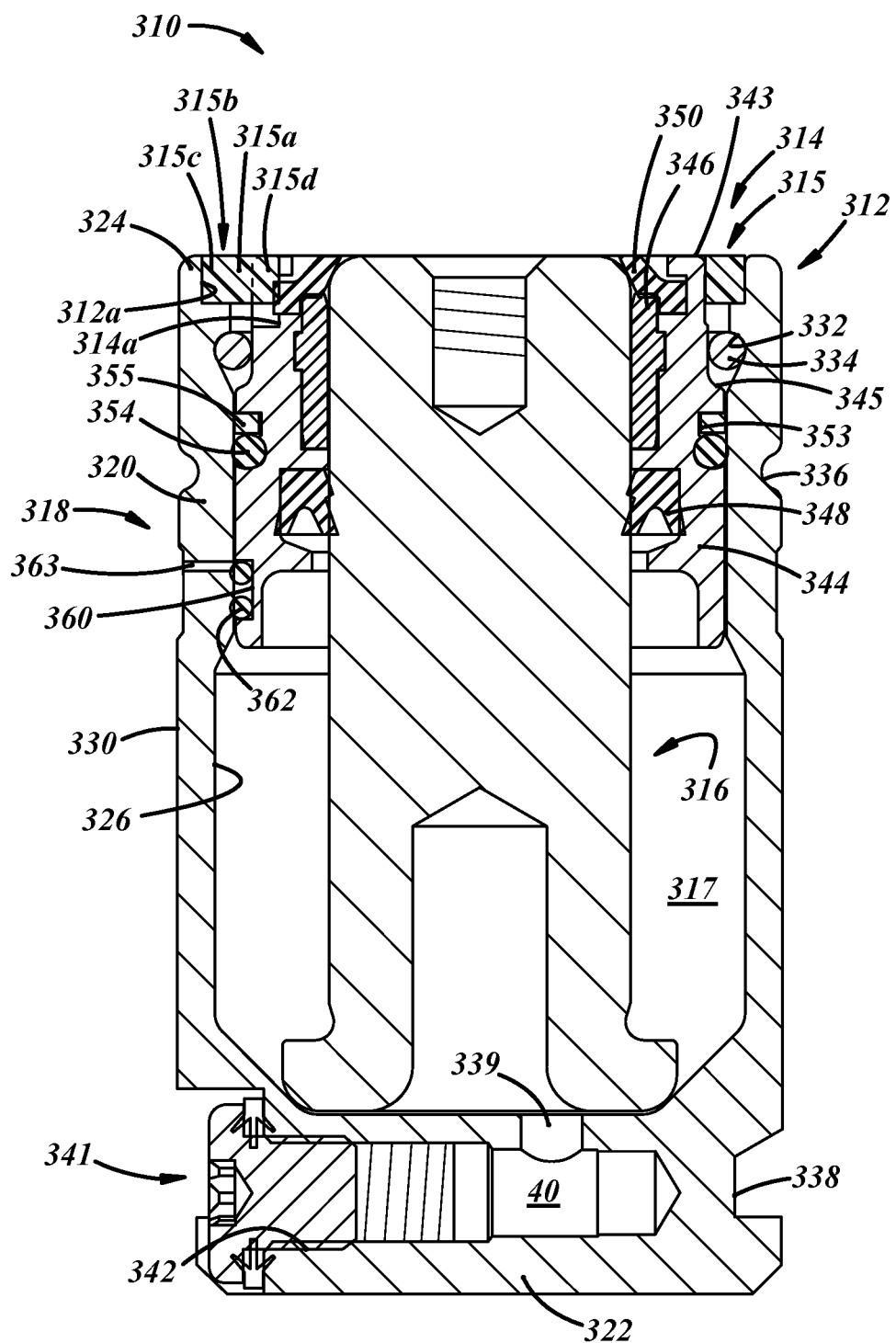
FIG. 13 is sectional view similar to that of FIG. 12 but, in contrast to FIG. 12, illustrates the piston in a retracted, overtravel position with respect to the casing.

With reference to FIG. 13, when the piston rod 316 has travelled past a design-intent fully retracted position, such that the piston rod 316 has overtravelled, the relief feature 318 enables desired depressurization of the pressure chamber 317. When the piston rod 316 overtravels, an upper end 343 of the housing 344 is struck by a part of press equipment (and/or a piston rod plate) to displace the housing 344 into the casing 312. The overtravel pressure relief feature 318 enables depressurization when the piston rod housing 344 is displaced into the casing 312 to an extent that the sealing between the seal 362 and the casing 312 is weakened, interrupted, or otherwise breached to allow gas to escape therebetween and out of the side of the gas spring 310. In other words, the seal 362 is displaced out of sealing registration with respect to the vent passage 363.

The gas spring 310 may be assembled in any suitable manner and its various components may be manufactured in any suitable manner and composed of any suitable materials. For example, the casing 312 may be turned, bored, drilled, tapped, and/or otherwise machined from tube and/or solid bar stock. In assembly, the guide and seal assembly 314 may be pre-assembled, and the piston rod 316 may be assembled through the housing 344, and the assembly 314 with the rod 316 therein may be assembled into the casing 312 circumferentially oriented with respect thereto via the locator 315. The radially inwardly projecting protuberance is received within the corresponding pocket 315d of the piston rod housing 344.

In operation, and with respect to FIG. 12, any suitable pressurizing device (not shown) may be coupled to the port 340 to open the valve 41 and introduce pressurized gas through the port 340 into the chamber 317. Once a desired pressure is reached, the pressurizing device may be retracted to allow the valve 341 to seat and thereby seal the pressurized gas within the pressure chamber 317.

Thereafter, the gas spring 310 may be used for any suitable purpose and, in the event of an overtravel condition where a machine component travels beyond a design intent position with respect to the gas spring 310, the machine component (and/or a piston plate) strikes the exterior end of the housing 344, thereby displacing the housing 344 axially into the casing 312, and thereby resulting in breach or unseating of the seal 362. Such unseating will allow pressurized gas in the chamber 317 to escape via the feature 318.

Figure 15:
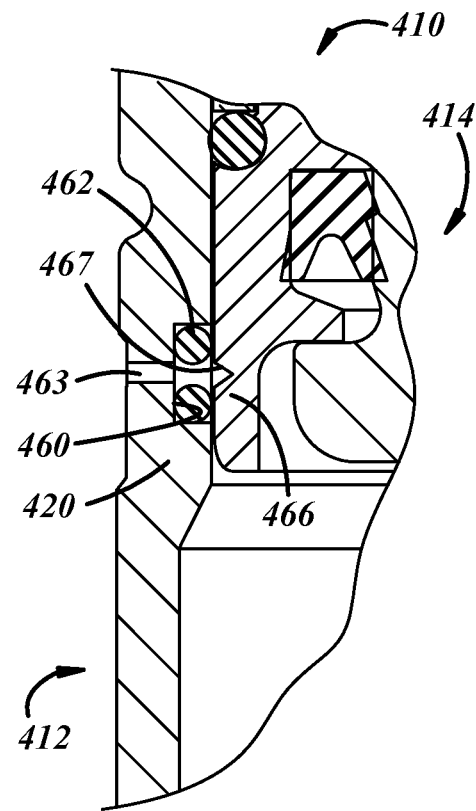
FIG. 15 is a fragmentary sectional view of an additional presently preferred form of a gas spring with overtravel pressure relief features.

FIG. 15 illustrates another presently preferred form of a gas spring 410. This form is similar in many respects to the form of FIGS. 1-14 and like numerals between the forms generally designate like or corresponding elements throughout the several views of the drawing figures. Accordingly, the description of the embodiments are incorporated by reference into one another in their entireties, and a description of the common subject matter generally may not be repeated here.

The gas spring 410 includes a casing 412, and a guide and seal assembly 414 carried by the casing 412, and an overtravel pressure relief feature 418 including portions of the casing 412 and the assembly 414. The relief feature 418 includes a vent seal 462 carried in a pocket 460 of a sidewall 420 of the casing 412, and a vent passage 463 through the sidewall 420. The relief feature 418 also includes a recess 467 in an outer surface of a piston rod housing 444. More particularly, the recess 467 may be a circumferentially extending notch in an outer diameter of a skirt 466 of the housing 444. In other embodiments, the recess 467 may be a groove, a flattening, a reduced diameter, a pocket, a step, turned down annulus, or any other relief in an outer portion of the piston rod housing 444. Under normal conditions, the recess 467 is located above the vent seal 462 such that the vent seal 462 is in contact with an outer surface of the skirt 466 in a location below the recess 467 so as to seal the passage 463.

In the event of an overtravel condition where a machine component travels beyond a design intent position with respect to the gas spring 410, the housing 444 is axially displaced into the casing 412, thereby displacing the recess 467 past a portion of the seal 462 into fluid registration or communication with the vent passage 463 to allow pressurized gas in a chamber 417 to escape via the overtravel relief feature 418. In this embodiment, the recess 467 is placed in fluid communication with an open center of the seal 462.

Figure 16:
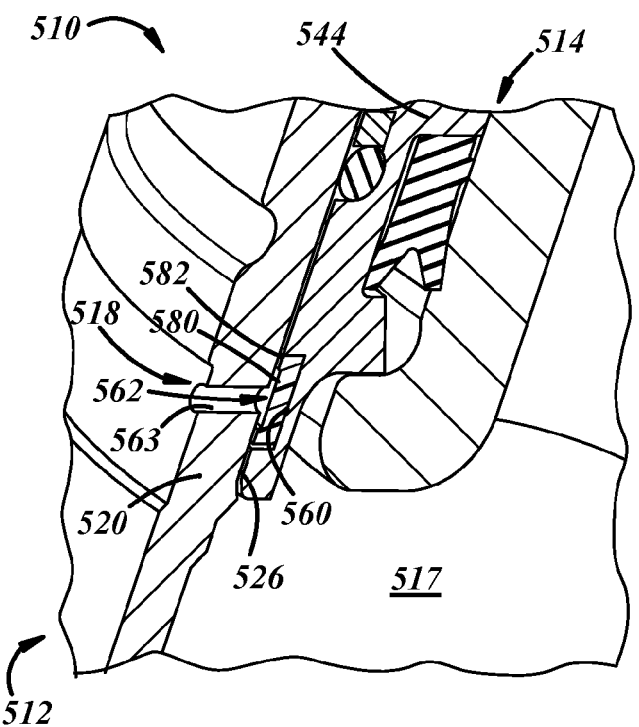
FIG. 16 is a fragmentary, sectional, perspective view of an additional presently preferred form of a gas spring with overtravel pressure relief features.
Figure 17:
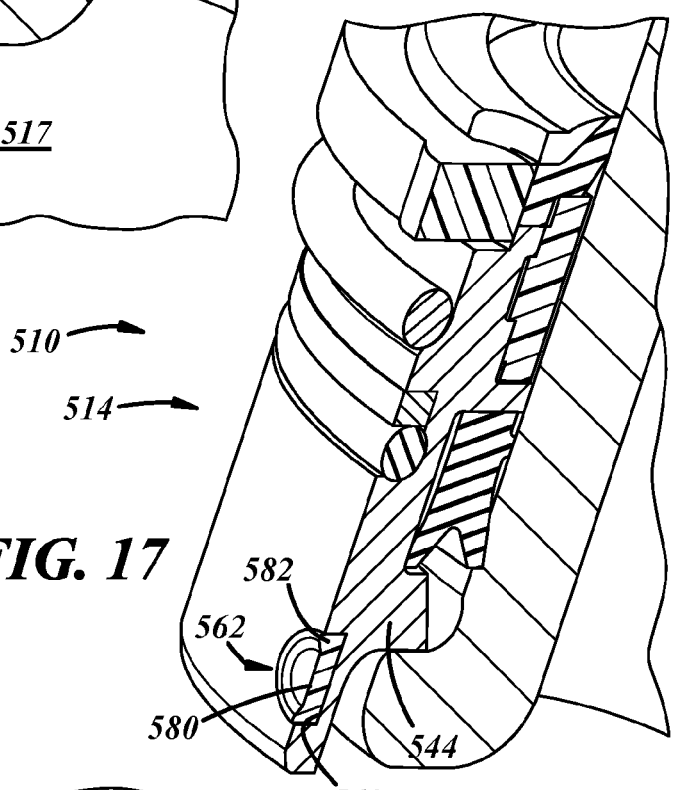
FIG. 17 is a fragmentary, sectional, perspective view of a portion of the gas spring of FIG. 16.

FIGS. 16 and 17 illustrate another presently preferred form of a gas spring 510. This form is similar in many respects to the form of FIGS. 1-15 and like numerals between the forms generally designate like or corresponding elements throughout the several views of the drawing figures. Accordingly, the description of the embodiments are incorporated by reference into one another in their entireties, and a description of the common subject matter generally may not be repeated here.

The gas spring 510 includes a casing 512, and a guide and seal assembly 514 carried by the casing 512, and an overtravel pressure relief feature 518 including portions of the casing 512 and the assembly 514. The relief feature 518 includes a vent seal 562 carried in a pocket 560 of a sidewall of a housing 544, and a vent passage 563 through a sidewall 520 of the casing 512.

The vent seal 562 is a puck or disc-shaped seal that includes a central portion 580 having a first thickness, and a radially outer annular portion 582 that is circumferentially continuous and disposed radially outward of the central portion 580 and having a second, maximum thickness greater than the first thickness. Accordingly, the annular portion 582 may encircle an inboard or inside end of the vent passage 563 and seal the vent passage 563 where the passage 563 intersects an inner surface 526 of the casing 512. In other words, the seal 562 is in sealing registration with respect to the vent passage 563. The vent seal 562 may be circular in outer profile, as illustrated, but may be square, oval, or of any other suitable shape.

In the event of an overtravel condition where a machine component travels beyond a design intent position with respect to the gas spring 510, the housing 544 is axially displaced into the casing 512. Such displacement results in displacement of the seal 562 with respect to the vent passage 563 such that a pressure chamber 517 inside the gas spring 510 is placed in fluid communication with the atmosphere outside of the spring 510 past a radial periphery of the seal 562 and through the vent passage 563. In other words, the seal 562 is displaced out of sealing registration with respect to the vent passage 563.

Figure 18:
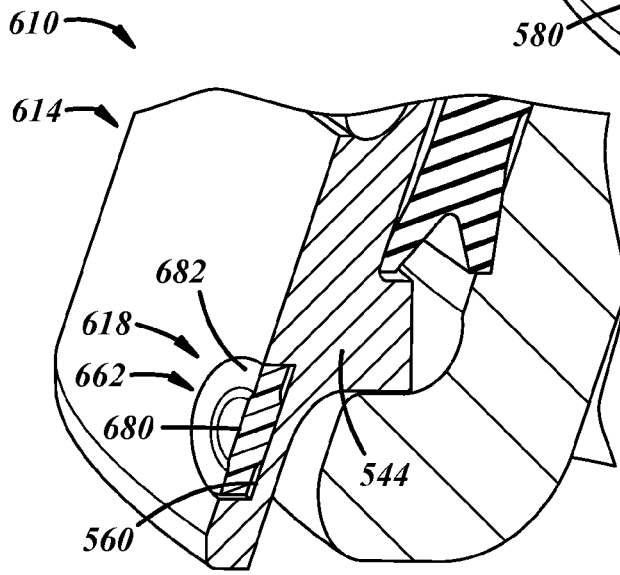
FIG. 18 is a fragmentary, sectional, perspective view of a portion of yet another presently preferred form of a gas spring with overtravel pressure relief features.

FIG. 18 illustrates another presently preferred form of a gas spring 610. This form is similar in many respects to the form of FIGS. 1-17 and like numerals between the forms generally designate like or corresponding elements throughout the several views of the drawing figures. Accordingly, the description of the embodiments are incorporated by reference into one another in their entireties, and a description of the common subject matter generally may not be repeated here.

The gas spring 610 includes a guide and seal assembly 614, and an overtravel pressure relief feature 618 including a vent seal 662 carried in the pocket 560 of the sidewall of the housing 544. The vent seal 662 is a puck or disc-shaped seal that includes a central solid plug or head portion 680 having a first, maximum thickness, and a radially outer annular portion 682 disposed radially outward of the central portion 680 and having a second thickness less than the first thickness. Accordingly, and with reference to the casing 512 of FIG. 16, the central portion 680 may block and seal an inboard or inside end of the vent passage 563 where the passage 563 intersects an inner surface 526 of the casing 512.

In one or more of the forms disclosed above, an overtravel condition moves a bearing housing, which movement may open one or more vent passages through a side wall of a casing. Such side venting avoids potentially undesirable discharge of pressurized gas out of the top of the gas spring. Also, overtravel pressure relief features do not fail during normal use from pressure fluctuations, for example, over 150-300 bar. Also, the features are retained during an overtravel condition to prevent any secondary hazard. Moreover, the overtravel pressure relief feature is configured to discharge pressure with overtravel on the order of 0.5 to 1.5 mm, for example. The overtravel pressure relief feature allows for normal operation of a gas spring and is configured for retrofit of existing products, which also can be serviced by an existing product repair kit and procedure. Additionally, the breach of the seal is a non-destructible function that does not involve shearing or cutting of any fittings, such that the gas springs of the presently disclosed embodiments may be refilled and reused without having to disassemble the gas spring to remove debris caused by the overtravel condition.

It should be appreciated that one of ordinary skill in the art will recognize other embodiments encompassed within the scope of this invention. The plurality of arrangements shown and described above are merely illustrative and not a complete or exhaustive list or representation. Of course, still other embodiments and implementations can be achieved in view of this disclosure. The embodiments described above are intended to be illustrative and not limiting. The scope of the invention is defined by the claims that follow.

The invention claimed is:

1. A gas spring for forming equipment, comprising:
a casing including an axially extending side wall, an open end, a transversely extending closed end wall axially spaced from the open end, a pressure chamber established in part by the side and end walls to receive a gas under pressure;
a piston rod received at least in part in the casing for reciprocation between extended and retracted positions and having an inner end communicating with the pressure chamber and an outer end extending generally axially outwardly of the open end of the casing when the piston rod is in its extended position;
a piston rod housing received at least in part in the open end of the casing between the piston rod and the casing, slidably received in the casing and having an interior end communicating with the pressure chamber and an exterior end axially spaced from the interior end and adjacent the open end of the casing, and slidably receiving the piston rod; and
an overtravel pressure relief feature including a vent path that is disposed between the pressure chamber and the outside of the gas spring and that includes a vent passage through the side wall of the casing and a seal that sealingly interrupts the vent path, and in an overtravel condition of the piston rod, the piston rod housing is displaced into the casing and opens the vent path to the exterior of the casing.

2. The gas spring of claim 1, wherein the overtravel pressure relief feature includes a hollow plug body coupled to the casing and carrying the seal.

3. The gas spring of claim 1, wherein the overtravel pressure relief feature includes a hollow plug body having a threaded portion threaded into the overtravel pressure relief passage of the casing and having a stepped down end carrying the seal.

4. The gas spring of claim 1, wherein the piston rod housing includes a cylindrical outer surface and at least one recessed portion axially adjacent the seal, wherein displacement of the housing into the casing results in breach of the seal.

5. The gas spring of claim 4, wherein the housing includes a seal groove axially spaced from the annular seal such that the recessed portion is disposed between the seal groove and the seal.

6. The gas spring of claim 5, wherein the recessed portion is in open communication with the seal groove.

7. The gas spring of claim 1, wherein the casing includes an internal annular casing seal groove carrying an annular casing seal, and the piston rod housing includes an overtravel pressure relief feature axially adjacent the casing seal, wherein displacement of the housing into the casing results in breach of the casing seal.

8. The gas spring of claim 1, wherein the overtravel pressure relief feature is an axially extending recessed portion in the piston rod housing.

9. The gas spring of claim 1, further comprising a housing cap coupled to an upper end of the piston rod housing to extend the length of the housing.

10. The gas spring of claim 9, wherein the housing cap and the upper end of the piston rod housing are coupled together via a retention ring and a plurality of set screws, wherein the retention ring is carried between corresponding radially outwardly and inwardly extending shoulders of the housing and the cap, and wherein the set screws are threaded through the cap into engagement with the retention ring to seat the retention ring to the corresponding housing shoulder.

11. The gas spring of claim 9, wherein the housing cap and the upper end of the piston rod housing are coupled together via a bayonet coupling.

12. The gas spring of claim 1, wherein the overtravel pressure relief feature includes a seal pocket in the piston rod housing and carrying the seal, wherein displacement of the housing into the casing results in displacement of a portion of the seal past the vent passage to breach the seal.

13. The gas spring of claim 1, wherein the overtravel pressure relief feature includes a seal pocket in the casing and carrying the seal, and wherein the piston rod housing includes a cylindrical outer surface and at least one recessed portion axially adjacent the seal, wherein displacement of the housing into the casing results in communication of the recessed portion with the vent passage to breach the seal.

14. The gas spring of claim 1, wherein the seal cooperates with the casing and the housing at the vent passage.

15. The gas spring of claim 14, wherein the seal is an annular seal that sealingly interrupts the vent path at an interior end of the vent passage.

16. The gas spring of claim 14, wherein the seal is a puck seal that sealingly interrupts the vent path around an interior end of the vent passage.

17. The gas spring of claim 16, wherein the puck seal includes a central portion having a first thickness and a radially outer annular portion disposed radially outward of the central portion and having a second thickness greater than the first thickness.

18. The gas spring of claim 16, wherein the puck seal includes a central portion having a first thickness, and a radially outer annular portion disposed radially outward of the central portion and having a second thickness less than the first thickness.

19. The gas spring of claim 1, wherein the opening of the vent path is a non-destructible function.

20. The gas spring of claim 19, wherein the opening of the vent path does not involve cutting of any fittings.

21. The gas spring of claim 1, further comprising a locator disposed between the piston rod housing and the casing to circumferentially locate the piston rod housing with respect to the casing to maintain the seal in position with respect to the vent passage.

22. The gas spring of claim 21, wherein the locator is part of a cover carried at a top of the gas spring and includes an annular shaped body and a locating feature that circumferentially intersects the annular shaped body.

23. The gas spring of claim 22, wherein the locating feature includes a radially outwardly projecting protuberance received within a corresponding pocket of the casing, and a radially inwardly projecting protuberance received within a corresponding pocket of the piston rod housing.

24. A gas spring for forming equipment, comprising:
a casing including an axially extending side wall, an open end, a transversely extending closed end wall axially spaced from the open end, a pressure chamber established in part by the side and end walls to receive a gas under pressure, and an internal annular casing seal groove in the casing;
an annular casing seal carried in the seal groove in the casing;
a piston rod received at least in part in the casing for reciprocation between extended and retracted positions and having an inner end communicating with the pressure chamber and an outer end extending generally axially outwardly of the open end of the casing when the piston rod is in its extended position; and
a piston rod housing received at least in part in the casing between the piston rod and the casing, slidably received in the casing, having an interior end communicating with the pressure chamber, an exterior end axially spaced from the interior end and adjacent the open end of the casing, slidably receiving the piston rod, having a cylindrical lower skirt in sealing engagement with the casing seal and having an overtravel pressure relief feature axially adjacent the casing seal; and
in an overtravel condition of the piston rod, the piston rod housing is displaced into the casing and breaches the sealing of the vent passage.

* * * * *